June 4, 1935.  R. J. CLARET  2,003,922
PRODUCTION OF CARBON DIOXIDE FROM FLUE GASES
Filed Jan. 26, 1933  4 Sheets-Sheet 1

INVENTOR-
R J Claret
By Wm H Reid
ATTORNEY-

June 4, 1935.  R. J. CLARET  2,003,922
PRODUCTION OF CARBON DIOXIDE FROM FLUE GASES
Filed Jan. 26, 1933  4 Sheets-Sheet 2
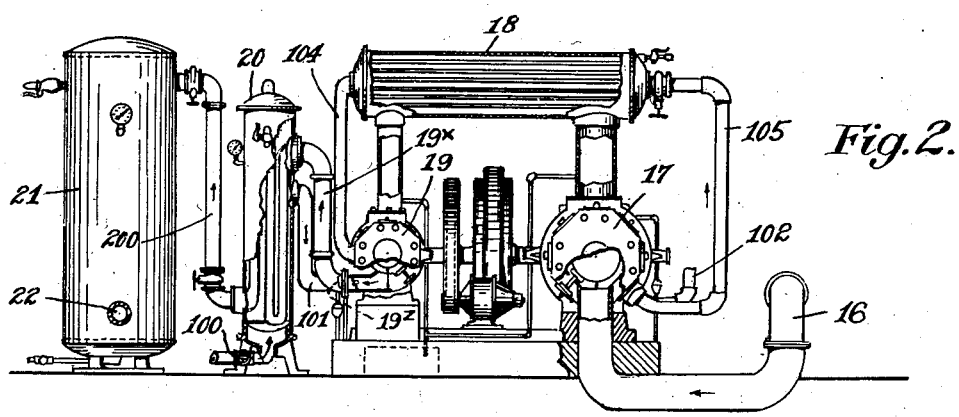
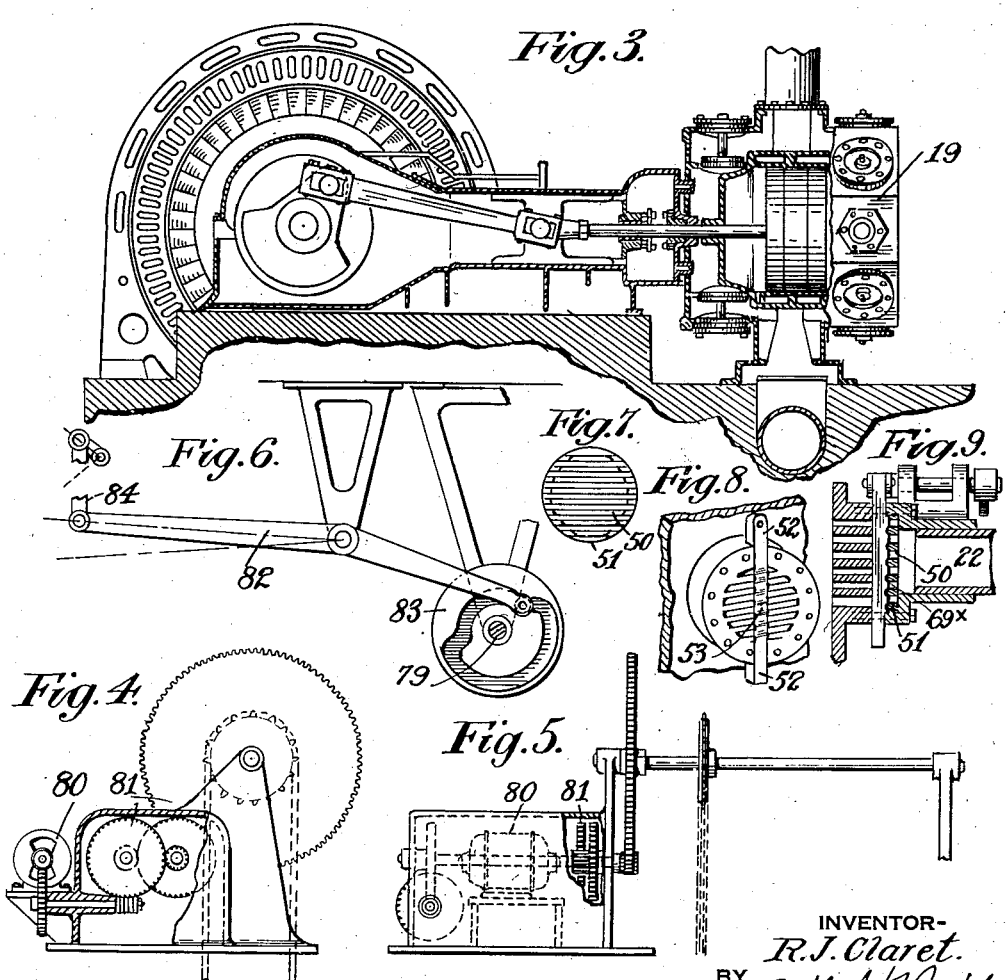
INVENTOR-
R. J. Claret.
BY
ATTORNEY-

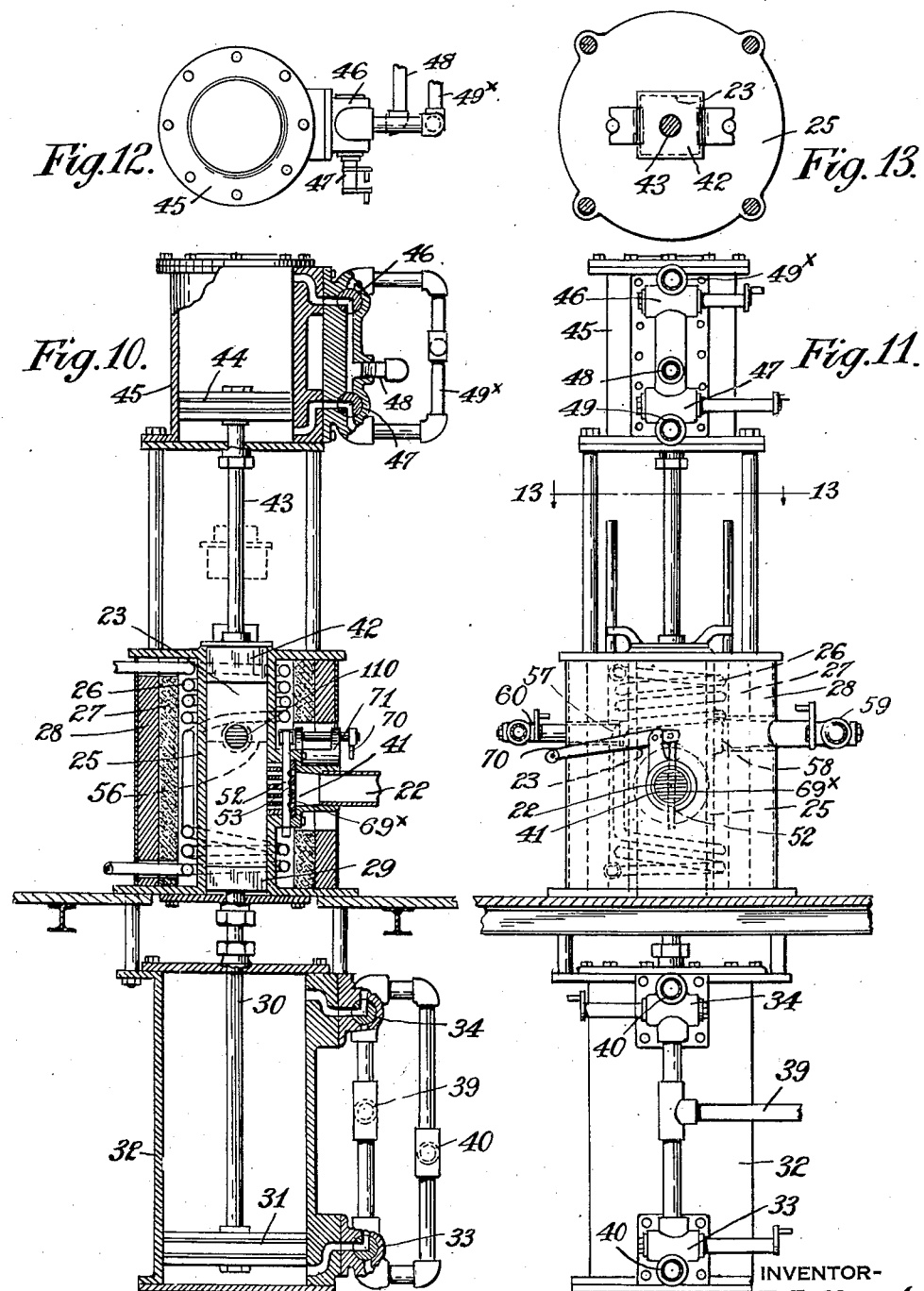

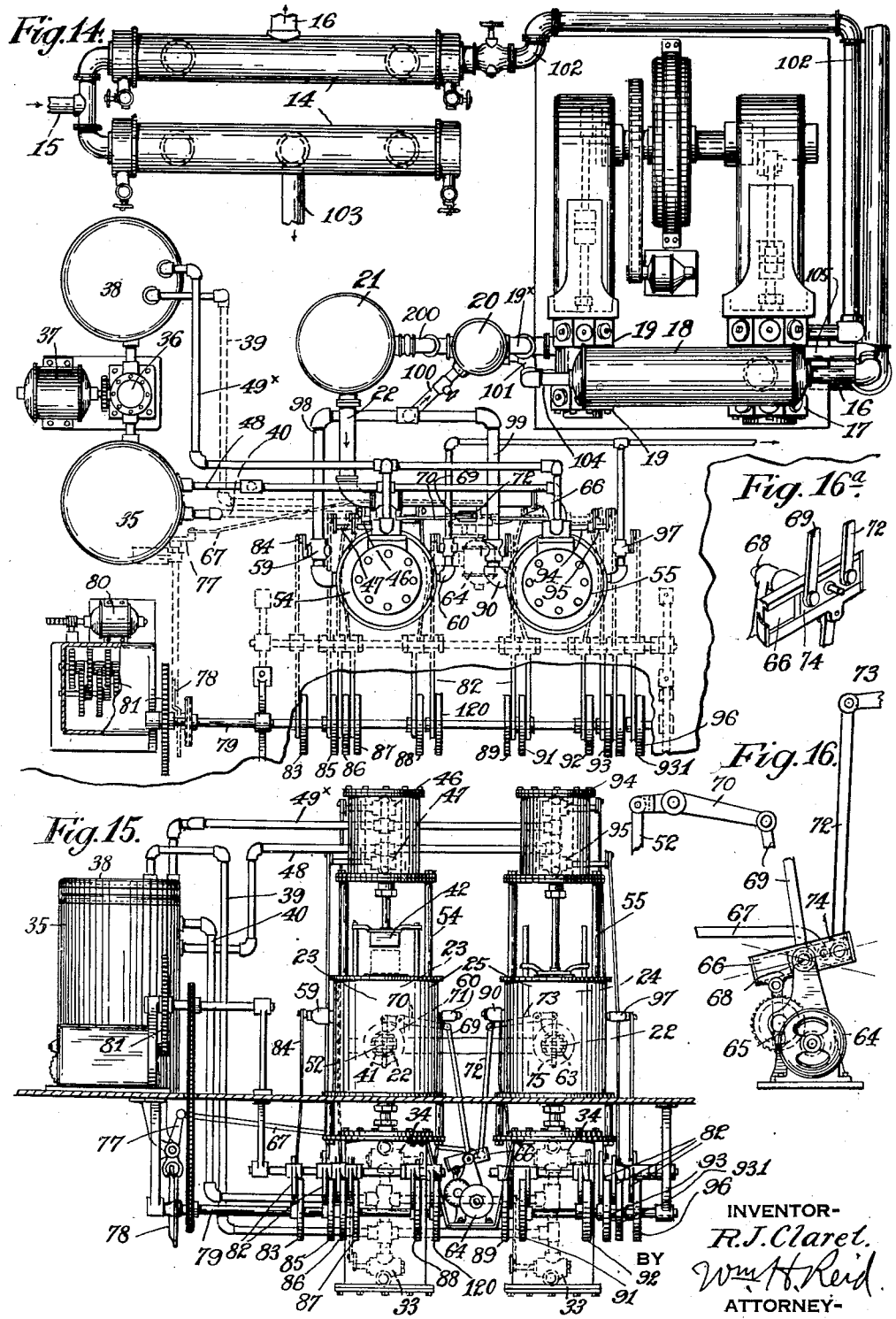

Patented June 4, 1935

2,003,922

UNITED STATES PATENT OFFICE 2,003,922

PRODUCTION OF CARBON-DIOXIDE FROM FLUE GASES

Roger J. Claret, New York, N. Y., assignor to Natural By-Products Corporation, New York, N. Y., a corporation of New York Application January 26, 1933, Serial No. 653,722

17 Claims. (Cl. 62—121)

This invention relates to the manufacture of solid carbon dioxide, generally known as carbon dioxide snow or ice, from the flue gases given off from the combustion chamber of a large variety of furnaces. These gases contain a certain amount of carbon dioxide gas; which is physically mixed with a large percentage of nitrogen, one of the components of the atmospheric air that is blown into the furnace to support the combustion of the fuel by the oxygen in the air.

The main object of this invention is to use these gases, and to separate by mechanical and physical means the carbon dioxide gas, from the nitrogen, which also is a gas, after a cleaning process for the elimination of practically all the other substances or materials in the flue gases, such as particles of dust, and water vapor and also sulphur compounds. These said gases, carbon dioxide and nitrogen, are subjected to compression to a relatively high degree, but less than that which would reduce the carbon dioxide gas to a liquid; and thereupon permitting this compressed gas to be suddenly expanded to form carbon dioxide snow, with escape of the nitrogen.

A further object of the invention is to provide for the escaping gas such as the nitrogen, in a condition of very low temperature, to operate as a cooling medium to reduce the temperature of the incoming gases before they enter the compressor; and also to cause such low temperature nitrogen to cool the compressor.

Another object of the invention is to provide for the final use of the said cool nitrogen gas to actuate a blower that will draw the incoming flue gases from the furnace and advance them through the several parts of the apparatus to effect the desired operations.

Heretofore the extraction of carbon dioxide gas from flue gases escaping from a furnace, has been brought about by certain chemical reactions on the carbon dioxide gas that would convert it into another compound, from which latter another chemical reaction would produce the carbon dioxide gas. One method has been the employment of potassium carbonate, that is placed in absorption towers and the solution of this potassium carbonate was allowed to trickle down the towers to absorb the carbon dioxide gas flowing upwards, thus producing potassium bicarbonate. The process further requires the treatment separately of the said bicarbonate to extract the carbon dioxide, whereby the potassium carbonate is further used for the same purpose of absorption. Obviously such a process, and such apparatus, is very expensive, since it necessitates a large amount of machinery, a large amount of steam and power are used, and is tedious in its operation.

Furthermore, when carbon dioxide gas is obtained from flue gases, or in fact from other sources, it is the present practice to compress this gas and to liquefy it afterwards, and then on expansion of this liquid carbon dioxide, the snow is produced.

The present invention overcomes these several disadvantages, in that the carbon dioxide gas is taken from the furnace chimney and is not changed, and does not undergo any chemical combination or dissociation; but the flue gases from the chimney are merely treated to remove dust and sulphur compounds, and water vapor; and are simply compressed to a degree that does not cause liquefaction of the carbon dioxide gas, whereby on sudden expansion of the compressed gases, that is, carbon dioxide gas mixed with nitrogen, the carbon dioxide snow is at once produced; and this snow can be pressed into block form as usual.

A further object of the invention is to provide means for causing the highly compressed mixture of carbon dioxide gas and nitrogen, to be conveyed alternately to a pair of expansion chambers that each functions as the cylinder of a press. The mixture of compressed gases is admitted to these two compression chambers at intervals alternately; and a control admission valve for each of these chambers is caused to open and close during the intervals at high speed, or in other words vibrates. At each admission of the compressed gas to the expansion chamber, a small quantity of the carbon dioxide snow is formed. At the conclusion of such an interval the admission valve is closed and a plunger in the expansion chamber serves to press into a block or cake of carbon dioxide ice the aggregate small quantities of snow flakes formed.

In the accompanying drawings showing embodiments of my invention:

Fig. 2 is a side elevation partly in section of the compressor and adjacent mechanism.

Fig. 3 shows the compressor.

Figs. 4 and 5 show the actuating mechanism for the multiple unit driving shaft.

Fig. 6 shows the cam drive for one of the valves.

Figs. 7, 8 and 9 show the details of one of these valves.

Fig. 10 is a section through the press for the ice blocks.

Fig. 11 is a side elevation of the same.

Fig. 12 is a plan view of the parts shown in Fig. 11.

Fig. 13 is a cross section on the line 13—13 of Fig. 11.

Fig. 14 is a plan view of the compressor and the ice block press with connecting parts.

Fig. 15 is a side elevation of the pair of ice block presses with adjacent parts.

Fig. 16 shows the actuating mechanism for the two vibrating valves.

Fig. 16a is a detail of the valve control.

Figure 1:
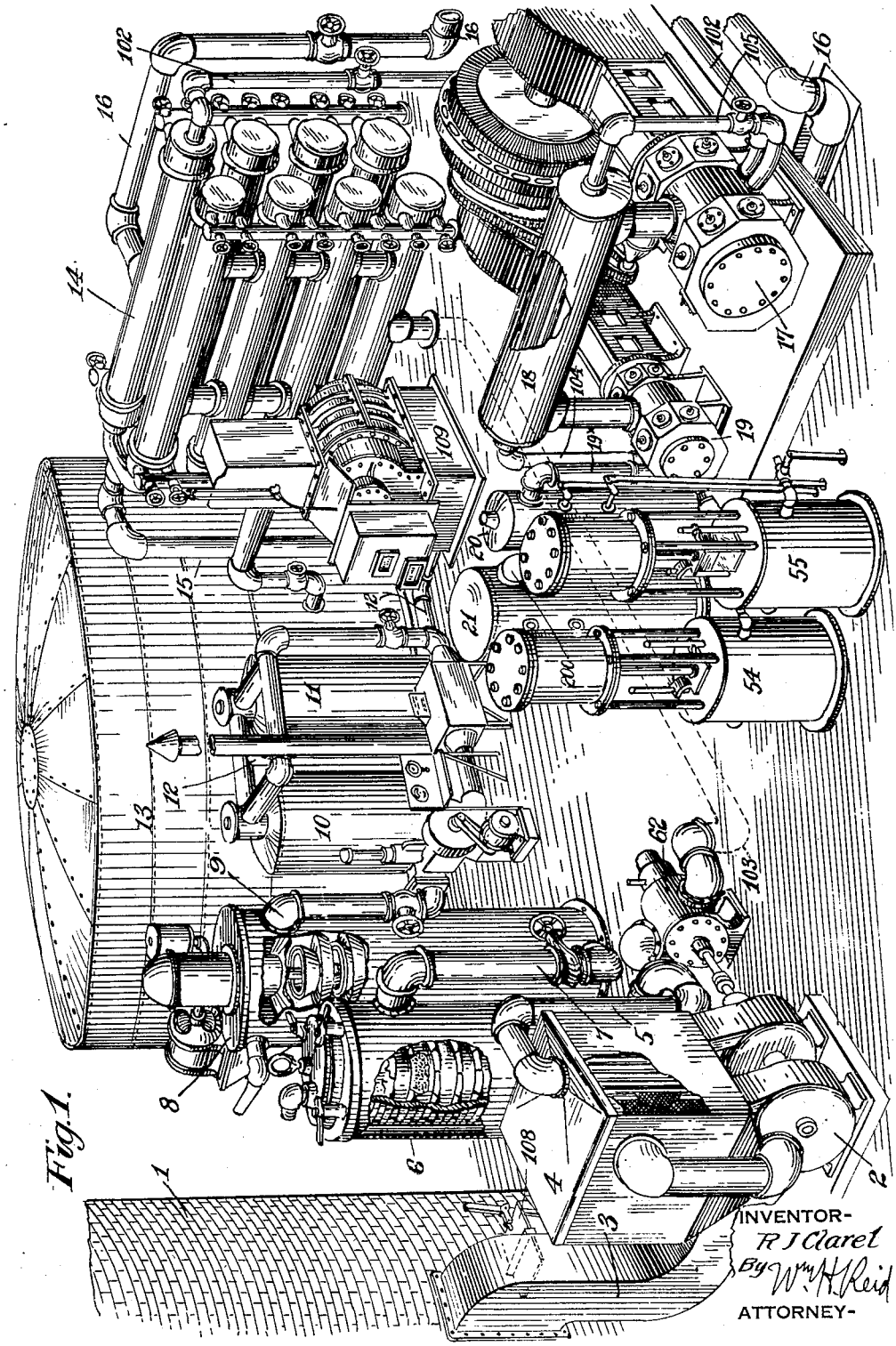
Figure 1 is a general perspective view of the complete system.

The principle of my invention is based on the adiabatic expansion of gases.

When a gas is in such a condition that no heat can enter or leave the system during the change of volume: upon expansion, the temperature changes during the operation. For my process I apply the equations given by Boyle's law and by Poisson.

$pv = RT$ and
$pv\gamma = c$ (Poisson's equation) *
*$\gamma$ is the Greek letter gamma.

I know that the adiabatic pressure of a gas varies inversely as the $\gamma$th power of the volume. $\gamma$ is a constant and is the ratio of the two specific heats of the gas Cp/Cv. In fact, for adiabatic changes, the absolute temperature of a gas varies inversely as the $(\gamma-1)$th power of the volume, a well known thermodynamic law. When the gas is expanded adiabatically and very rapidly, the gas is cooled to a temperature lower than the original. For instance, if one cubic foot of gas at 32° Fah. is allowed to expand adiabatically to two cubic feet, there will be a fall in temperature of 119° Fah.

As shown generally in Figure 1, the apparatus comprises a blower 2 that withdraws the flue gases from the breeching of the chimney 1 through a pipe 3 equipped with a baffle plate 108 to regulate at will the volume of flue gases collected, and forces these gases into a dust removal apparatus 4. From the latter the gases pass by pipe 5 into a chemical scrubber 6, specially designed for removing objectionable sulphur compounds from the flue gases. These gases usually contain about 82 per cent of nitrogen, 13 to 15 per cent of carbon dioxide, the remaining proportion being water vapor, oxygen and sulphur compounds, usually $SO_2$, sulphur dioxide or $SO_3$, sulphur trioxide. This scrubber preferably contains limestone or calcium carbonate, $CaCO_3$, over which water is caused to trickle. The gases that enter at the bottom of the chemical scrubber through pipe 5, and pass out through pipe 7 at the top, cause the sulphur compounds which they contain to combine with the water trickling down, to form sulphuric acid, which reacts with the limestone to form calcium sulphate $CaSO_4$, with evolution of carbon dioxide gas. This calcium sulphate is insoluble in water; it is in part washed down by the water and the clean gases pass out at the top of the scrubber.

Since the gases passing out contain some water vapor, and perhaps slight residual traces of sulphur compounds, I provide a second vertical scrubber 8 into which the gases are introduced through pipe 7. This second scrubber 8 is of a special centrifugal type, but comprises mainly streams of water flowing down; through which the gases pass, with exit at the upper part through a pipe 9. After this second scrubber, the gases contain water vapor, and therefore are passed through a dryer, indicated by a pair of tanks 10 and 11, from which the dried cleaned gases, now consisting only of nitrogen and carbon dioxide, are passed by pipe 12 into a booster acting also as a gas meter then into a gas holder or tank 13. To overcome the resistance of the advance of the flue gases from the chemical scrubber, I arrange a booster 109 between the dryer and the tank 13 to increase the force to drive the gases along. The form of dryer that I have found to operate very well for this purpose comprises the tanks 10 and 11 that contain suitable substances that readily adsorb the aqueous vapor or water contained in the gases. But the gases are passed alternately through these two tanks, and the tank not in use has the adsorbing material dried, by passing a current of heated air through the same. Thus each tank is reactivated while the other one is removing the moisture from the gases.

From this receiving tank 13 the gases are treated by a suitable compressor whereby its pressure can be brought up to about 400 to 500 pounds; and then the compressed gases are suddenly released into an expansion chamber, which is equipped with a plunger. The compressed gases are admitted into the expansion chamber by a kind of vibrating valve, in a quick succession of charges. Each charge produces a small amount of solid carbon dioxide, in the nature of snow. The aggregate of these charges in the expansion chamber is acted upon by the plunger, this chamber forming a mold or practically the cylinder of a press, where this snow is compressed into a solid block or cake of the so-called snow ice.

The system, from the gas holder 13 to the final expansion chamber, is shown as including a heat exchanger 14, into which the gases are led by a pipe 15. From the heat exchanger the gases pass by pipe 16 into the first cylinder 17 of the compressor. After passing through an inter-cooler 18, these gases enter the second cylinder 19 of the compressor, where the gases are compressed to from 400 to 500 pounds. The compressed gases now pass from the second cylinder 19, by pipe 19x controlled by check valve 19z into an after-cooler 20, where they are further cooled, and thence into a receiving tank 21, by pipe 200, see Figs. 2 and 15. From the tank 21 the gases are passed by pipe 22, to the expansion chambers 23 and 24, being alternately admitted by special valves from pipe 22.

In Figs. 10-15 the details of these expansion chambers or presses are shown. These presses are in duplicate, and each comprises a main cylinder 25, that is shown with special cooling means such as a coil 26, a balsa wood lining 27, and an insulating jacket 28. A square piston 29 slides in the cylinder 25, and connects by rod 30 with piston 31 in a cylinder 32. The latter has valves 33 and 34 at its ends, for actuating means such as hydraulic pressure, from a tank 35. The latter is controlled by a pump 36 and motor 37, and a return tank 38 is used in the system. Exhaust pipes 39 and 40 connect with these valves, and with the two tanks 35 and 38 in the usual manner. It is understood that when the lower valve 33 is open to pressure tank 35 the piston 31 is forced upwardly, and the piston 29 moves upwardly; while the latter returns when the valve 34 admits pressure to force the piston 31 downward. The compressed gases from the pipe 22 enter the cylinder 25 at a valved opening 41, and when the piston 29 is moved upwardly to compress the snow in the cylinder 25, the upper end of this cylinder is closed by a head 42. The latter is carried by piston rod 43, at the upper end of which is a piston 44 sliding in a cylinder 45. The latter has valves 46 and 47 to control ports at the ends, that connect with pipes 48 and 49x leading to the hydraulic tanks 35 and 38. By the proper operation of these valves 46, 47 the piston 44 can be moved upward or downward, but this piston is held in the lower position to retain the head 42 closing the cylinder 25 when the block is being compressed. The piston 44 is moved upward to withdraw head 42 from the cylinder 25, and the lower piston 29 is moved upwardly and ejects the block of ice from this cylinder at its top.

This admission valve is shown in Figs. 7, 8 and 9, and comprises a series of spring strips 69x that normally close a series of slots 50 in a plate 51, thus closing the admission from the pipe 22 to cylinder 25. A slide 52 moves to have its ribbed edge 53 engage these spring strips to hold them closed in one position, and to leave them free when in another position. These strips are on the lower part of the slotted plates, and act to admit the gases under pressure from the pipe 22; but when the slide is advanced it locks these strips in the closed position. Suitable means are provided whereby this slide 52 is reciprocated very rapidly such as one hundred times per minute. This functions to admit small quantities of the compressed gases from the storage cylinder 21 into the expansion chamber, which is the cylinder 25 of one press. A pair of presses are provided, as indicated at 23 and 24 in Fig. 15. These are identical, but the admission valves which were described are operated alternately, that is, the vibrating valve 51 for the press 23 is operated for two minutes, then such valve is closed, and the admission valve 63 for the other press 24 vibrates for two minutes. It is further understood that during these intervals, when one press is receiving the compressed gas by vibration of its admission valve, the other press functions by the piston 29 rising from the lower position to the line 56, whereby the accumulated snow charges of carbon dioxide snow in this cylinder are compressed, and then the piston 29 continues to rise, for the reason that the upper head 42 is then withdrawn by its controlling piston 44. Thus the ice block is ejected from the cylinder 25 at the top, and can be withdrawn by the operator. Thereupon piston 29 and head 42 are returned to the normal positions.

In the press 23 the cylinder 25 is provided with outlet ports 57 and 58 at the upper part just below the normal position of the head 42, see Fig. 11. The port 58 is closed by valve 59 that is normally open, while the port 57 is closed by valve 60 that is normally closed. It is understood that when the mixed and highly compressed gases enter cylinder 25 at the valved opening 41, the carbon dioxide gas due to the intense lowering of temperature produced by the sudden expansion of the mixed gases mostly condenses into snow, while the nitrogen which does not change passes out through the outlet valve 59. But when the admission valve 41 for the cylinder closes and the piston 29 is raised to compress the snow, this nitrogen valve 59 is closed, and the other valve 60 is opened. This is to permit the portion of carbon dioxide gas, that is formed due to the fact that a part of the carbon dioxide snow sublimes during the compression of the snow, to be forced out through the outlet 57, and to be received in a suitable tank. This is practically pure carbon dioxide, and can be used over again in this purpose or for any other desired purpose.

It is understood that the nitrogen gas passing out through the ports 58 is of low temperature and can be used for cooling the incoming mixture of gases as well as the different pieces of apparatus of my system. For instance, the nitrogen gas can pass through the after-cooler 20. Thence through the jacket of the high pressure cylinder 19, then through the inter-cooler 18 of the compressor, and also through the jacket of the low pressure cylinder 17 of the compressor. This cool nitrogen gas can now pass through the heat exchanger device 14 so that the incoming mixture of gases will be cooled before entering the compressor. After being used for cooling, the nitrogen gas still has some pressure, and is led to a specially designed turbine 62, and this turbine propelled by nitrogen gas provides power to drive the blower 2.

As best shown in Fig. 16 a motor 64 through a crank 65 rocks a slotted arm 66 that swings on a pin 68. A block 74 slides in the arm 66. This block has pivoted thereto a link 69 that through rock arm 70 mounted on bracket 71 will reciprocate the slide 52. A similar link 72 is pivoted on the block 74 and through rock arm 73 will reciprocate the slide 75 of the other valve 63. The block 74 is reciprocated in the arm by a link 67 and rock arm 77 that engages a cam 78 on a driving shaft 79 (Figure 14). It will be understood that shifting of this block 74 will bring either one of the pivotal ends of the links 72 or 69 to the center of the rock of the arm 66, so that this valve slide will not move but the other one will be reciprocated.

This driving shaft 79 is actuated from a motor at 80 by suitable gearing indicated generally at 81 to make one rotation in about four minutes, and this shaft carries 12 cams serving to actuate the four valves of each of the presses and also the nitrogen and carbon dioxide valves of these presses. For each of these valves is a rock arm 82, see Fig. 6, that is rocked by a cam on the shaft 79. The first cam 83 on the shaft 79 will actuate the nitrogen valve 59 by link 84. The second cam 85 on the shaft will actuate the lower valve 47 controlling the press plunger 42. The next cam 86 will operate the upper valve 46 of the same piston 44. The next cam 87 will operate the lower valve 32 of the press, while the next cam 88 will operate the upper valve 34 of the press. Another cam 89 will operate the nitrogen valve 90 of the press 55. The next two cams 91 and 92 will operate the two lower valves of the press 55. The next two cams 93 and 931 will operate the two valves 94 and 95 of the upper cylinder of this press, and the next cam 96 will operate the carbon dioxide valve 97 of this second press. Cam 120 operates carbon dioxide valve 60.

The ports 57 and 58 of each cylinder for the escape of the nitrogen and of the carbon dioxide, will be each provided with a screen 110 of wire gauze or the like, to prevent escape of the carbon dioxide snow in the stream of the nitrogen or of the carbon dioxide gases, that pass out of the expansion chamber.

When the nitrogen leaves the cylinder through valves 59 or 90 it is received in pipes 98 and 99, and is led by pipe 100 into the jackets of the after-cooler 20. (Figure 14.) It will be understood that this nitrogen is still at a very low temperature and will serve to cool the incoming mixed gases passing through the after-cooler. From this device the nitrogen will pass by pipe 101 to the jacket of the high pressure cylinder 19 of the compressor, and thence by pipe 104 to the inter-cooler 18, thence to the jacket of the low pressure cylinder 17 by pipe 105, thence by pipe 102 to the heat exchanger 14. From the latter the nitrogen is passed by pipe 103 to the turbine 62 and will drive the same to furnish power to drive the blower, since the nitrogen gas will still be under pressure.

The temperature of the products of combustion on flue gases as they leave the chimney is approximately 280° F. and are under a pressure of approximately five pounds above absolute. By the passage of the gases through the dust remover 4 the temperature is reduced to approximately 225° F. and is further reduced to approximately 150° F. in its passage through the scrubber 6 and to 100° F. by its passage through the scrubber 8. The temperature of the gas is not reduced in its passage through the dryer and remains approximately at the same temperature as it leaves the scrubber 8. As the gases enter the holder 13, there is a slight expansion and the temperature is reduced to approximately 80° F. The gases are delivered from the holder 13 to the heat exchanger 14 under approximately twenty-five pounds of pressure by the booster 109 and the temperature is raised to approximately 100° F., the temperature of the gases in their passage through the heat exchanger being reduced to approximately 40° F. and are entered into the primary compressor 17 under pressure of approximately thirty pounds, the gases being placed under pressure of approximately one hundred and twenty-five pounds by the primary compressor and under a pressure of approximately five hundred pounds by the secondary compressor 19, the increase in heat during compression being removed by the use of the coolers 18 and 20, in which coolers they are maintained under a pressure of approximately five hundred pounds and are released under such pressure into the expansion chamber at between —75° F. and —95° F. The slotted plate 51 and vibratory valve 69x at the inlet to the expansion chamber function in the manner of a porous block in that it retards the passage of the gases into the expansion chambers, thus expanding a part of its energy and effecting a lowering of the temperature, there being a further expansion and lowering of the temperature of the gases as they enter into the expansion chambers, this expansion being an adiabatic expansion due to the insulating of the expansion chambers and whereby there will be no transference of heat to or from the gases during expansion thereof in the expansion chambers.

What I claim is:—

1. Process for production of solid carbon dioxide that consists in subjecting carbon dioxide gas to high compression without liquefaction of the gas, then passing the gas into a receiving tank, then causing the gas from the receiving tank to be released in an expansion chamber in small quantities in rapid succession for alternate periods of time to form snow in the chamber.

2. Process for production of solid carbon dioxide that consists in subjecting carbon dioxide gas to high compression without liquefaction of the gas, then passing the compressed gas into a receiving tank, then causing the gas from the receiving tank to be released in an expansion chamber in small quantities in rapid succession for alternate periods of time to form snow in the chamber, and then pressing the masses of snow in the chamber into a block at periods of time alternate with said periods of snow formation in the chamber.

3. Process for production of solid carbon dioxide that consists in subjecting carbon dioxide and nitrogen gases to high compression without liquefaction of the carbon dioxide gas, then passing said compressed gases into a receiving tank, then causing the compressed gases from the receiving tank to be released in an expansion chamber in small quantities in rapid succession to form snow in the chamber from the carbon dioxide, and leading the nitrogen gas from said chamber to cause it to cool the incoming gases before reaching the compressor.

4. Process for production of solid carbon dioxide that consists in subjecting carbon dioxide and nitrogen gases to high compression without liquefaction of the carbon dioxide gas, then passing said compressed gases into a receiving tank, then causing the compressed gases from the receiving tank to be released in an expansion chamber in small quantities in rapid succession for alternate periods of time to form snow in the chamber from the carbon dioxide with escape of the nitrogen gas.

5. Process for production of solid carbon dioxide that consists in subjecting carbon dioxide and nitrogen gases to high compression without liquefaction of the carbon dioxide gas, then passing said compressed gases into a receiving tank, then causing the compressed gases from the receiving tank to be released in an expansion chamber in small quantities in rapid succession for alternate periods of time to form snow in the chamber from the carbon dioxide, with escape of the nitrogen gas, and then pressing the said masses of snow in the chamber into a block in the periods of time alternate with the said periods of snow formation in the chamber.

6. Process for production of solid carbon dioxide that consists in subjecting carbon dioxide and nitrogen gases to high compression without liquefaction of the carbon dioxide gas, then passing said compressed gases into a receiving tank, then causing the compressed gases from the receiving tank to be released in an expansion chamber in small quantities in rapid succession in alternate periods of time to form snow in the chamber from the carbon dioxide with escape of the nitrogen gas, and then pressing said masses of snow in the chamber into a block in the periods of time alternate with said periods of snow formation in the chamber, and permitting escape of the free carbon dioxide gas from the expansion chamber during said periods of the compression of the snow in the chamber.

7. In means for forming solid carbon dioxide, a compressor for pressing carbon dioxide gas to a high degree without liquefaction of the gas, an expansion chamber having an opening in one end and an inlet connected with the compressor, a cooler for the gas interposed in the connection of the chamber with the compressor, a reciprocatory head normally closing the opening in the expansion chamber, a valve to control said inlet to the expansion chamber, means to actuate said valve to open the expansion chamber to and shut off said chamber from the compressor at a high rate of speed for alternate periods of time to release the gas into and produce snow in the expansion chamber, a reciprocatory plunger in the expansion chamber, means for advancing the plunger in the expansion chamber in the periods of time alternate with said periods of operation of the inlet control valve to press the snow into a block in the chamber, and means to cause the plunger and head to co-operate to eject the snow block from the expansion chamber.

8. In means for forming solid carbon dioxide from gases containing carbondioxide and nitrogen, a compressor for pressing such gases to a high degree without liquefaction of the carbon dioxide, a storage tank connected with and for receiving the compressed gases from the compressor, a cooler for the gases interposed in the connection of the tank with the compressor, an expansion chamber having a valve controlled connection with the storage tank and a valve controlled outlet, means to actuate said valves to open the expansion chamber to and shut the same off from the storage tank at a high rate of speed for alternate periods of time to permit the gases to be released into and produce snow in the expansion chamber and escape of the nitrogen gas from the outlet of the expansion chamber, and means to press the snow into a block in the expansion chamber.

9. In means for forming solid carbon dioxide from gases containing carbon dioxide and nitrogen, means for compressing such gases to a high degree without liquefaction of the carbon dioxide, an expansion chamber having an inlet connected with the compressing means and an outlet, means to cool the gases interposed in the connection of the expansion chamber and compressing means, valves to control said inlet and outlet, means to actuate said valves to open the expansion chamber to and shut the same off from the compressing means at a high rate of speed for alternate periods of time to permit release of the gas into and produce snow in the expansion chamber and escape of the nitrogen gas from said chamber, and means to connect the outlet of the expansion chamber with the cooling means interposed in the connection of the expansion chamber with the compressing means to cause the nitrogen gas from the expansion chamber to cool the gases in their passage from the compressing means.

10. Means for forming solid carbon dioxide, including a compressor for pressing carbon dioxide gas to a high degree without liquefaction of the gas, a storage tank having a connection with and to receive the compressed gas from the compressor, an expansion chamber, means to connect the expansion chamber with the storage tank, a cooler interposed in said connection, a valve for controlling said connection, means to actuate said valve to open and shut off said connection at a high rate of speed for alternate periods of time to permit the gas to be released into and produce snow in the expansion chamber.

11. Means for forming solid carbon dioxide, including a compressor for pressing carbon dioxide gas to a high degree without liquefaction of the gas, a storage tank having a connection with and to receive the compressed gas from the compressor, an expansion chamber having an inlet connected with the storage tank, a valve controlling said inlet, means for actuating said valve to open and shut off said connection at a high rate of speed for alternate periods of time to permit the gas to be released from the storage tank into and produce snow in the expansion chamber, and means in the expansion chamber operative for pressing the snow into a block.

12. Means for forming solid carbon dioxide, including a compressor for pressing carbon dioxide gas to a high degree without liquefaction of the gas, a storage tank connected with and to receive the compressed gas from the compressor, a cooler for the gas interposed in the connection of the tank and compressor, an expansion chamber having an inlet connected with the storage tank, a valve for said inlet, means for actuating said valve to open the expansion chamber to and shut the same off from the storage tank at a high rate of speed for alternate periods of time to permit the gas to be released from the storage tank into and produce snow in the expansion chamber, a plunger in said chamber, and means for advancing the plunger in the chamber in the periods of time alternately with said periods of operation of said inlet valve to press the snow into a block in the expansion chamber.

13. In means for forming solid carbon dioxide from gases containing carbon dioxide and nitrogen, means to compress said gasses to a high degree without liquefaction of the carbon dioxide, an expansion chamber having an inlet connected with the compressing means, cooling means for the gases interposed in the connection of the chamber with the compressing means, a valve for said inlet, means for actuating said valve to open the expansion chamber to and shut the same off from the compressing means at a high rate of speed for alternate periods of time to release the gas into and produce snow in the expansion chamber, means to solidify the carbon dioxide snow in the chamber, a valve normally closing the outlet in the chamber for the compressed snow, an outlet for the carbon dioxide gas from the expansion chamber having a valve normally closing the same, an outlet for the nitrogen gas from the expansion chamber having a valve normally opening the same, and means to actuate said valves to open the carbon dioxide outlet and close the nitrogen outlet during compression of the snow in the chamber.

14. In means for forming solid carbon dioxide from gases containing carbon dioxide and nitrogen, means for compressing such gases to a high degree without liquefaction of the carbon dioxide, a storage tank to receive the compressed gases from the compressing means, an expansion chamber, a cooler for the gases interposed in the connection of the tank with the compressing means having an inlet connected with the storage tank, a valve for said inlet, means for actuating said valve to open the expansion chamber to and shut the same off from the storage tank at a high rate of speed for alternate periods of time to permit the gases to be released into and produce snow in the expansion chamber, a reciprocatory plunger in the expansion chamber, means for advancing the plunger in the expansion chamber in the periods of time alternate with the periods of operation of said inlet valve to press the snow into a block, a reciprocatory head normally closing one end of the expansion chamber, means to move the head away from said opening to permit ejecting the snow block by said plunger, an outlet for the carbon dioxide gas from the expansion chamber, a valve for said outlet normally positioned to open said outlet, an outlet for the nitrogen gas from the expansion chamber, a valve for said outlet normally positioned to close said outlet, and means to actuate the valve for and to open the carbon dioxide outlet and the valve for and close the nitrogen outlet during compression of the snow in the chamber.

15. In means for forming solid carbon dioxide, means to compress the carbon dioxide gas to a high degree without liquefaction thereof, a pair of expansion chambers, a valved connection between each chamber and the compressing means, means to cool the gas interposed in the connection of the chambers with the compressing means, means for opening said valves alternately to admit the compressed gas to the chambers in succession, a plunger in each chamber for compressing the snow into a block, and means to actuate the plungers alternately with the admission of the gas to the chambers.

16. In means for forming solid carbon dioxide, means for pressing the gas to a high degree without liquefaction of the gas, a pair of expansion chambers, a valved connection between each chamber and the compressing means, means for cooling the gases interposed in the connection of the chambers with the compressing means, means for actuating said valves to open the chambers to and shut off said chambers from the compressing means at a high rate of speed for certain periods of time which periods alternate for the two valves with the valve closed to one chamber while the other chamber valve is in operation, a reciprocatory plunger in each chamber, means to actuate the chamber plungers alternately with the admission of the gas to the chambers to press the snow into blocks, a reciprocatory head in each chamber normally closing the ends of the chambers, and means to actuate the heads after the pressing of the snow into blocks by the plungers to permit ejecting of the snow block from the chambers.

17. In means for forming solid carbon dioxide, means for pressing the gas to a high degree without liquefaction of the gas, a storage tank having a check valve controlled connection with the compressing means, means interposed in the connection of the tank with the pressing means to cool the gas, a pair of expansion chambers, a valved connection between each chamber and the tank, means for actuating said valves to open the chambers to and shut off the chambers from the tank at a high rate of speed for certain periods of time alternate for the two valves with the valve closed to one chamber while the other chamber valve is open, a reciprocatory plunger in each chamber, means to actuate the plungers alternately with the admission of gas into the chambers to press the snow into blocks in the chambers, a reciprocatory head for and normally closing one end of each chamber, and means to actuate the head of each chamber after the pressing of the snow into a block by the plungers to permit the ejecting of the compressed block of snow by the plungers.

ROGER J. CLARET.